Jan. 22, 1957  C. C. CARSON  2,778,570
FLUID FLOW REGULATOR
Filed Nov. 20, 1952
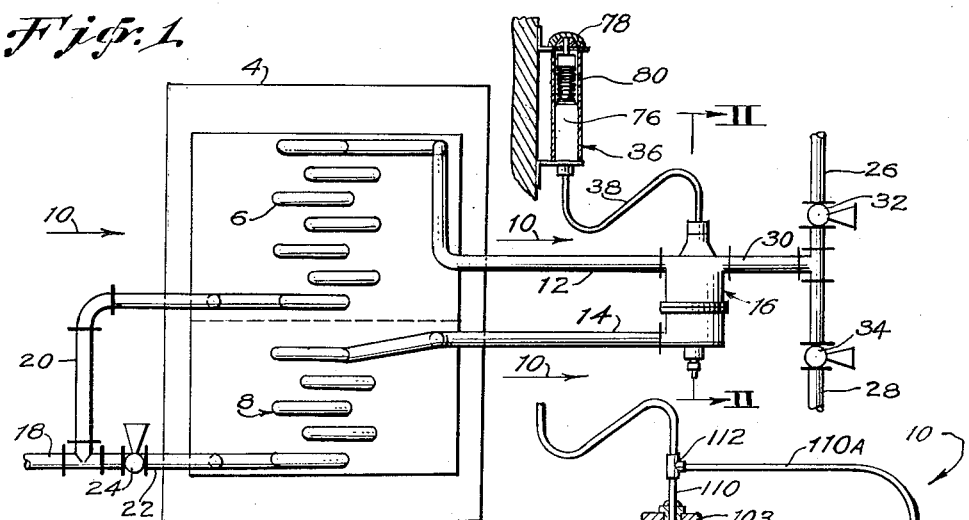
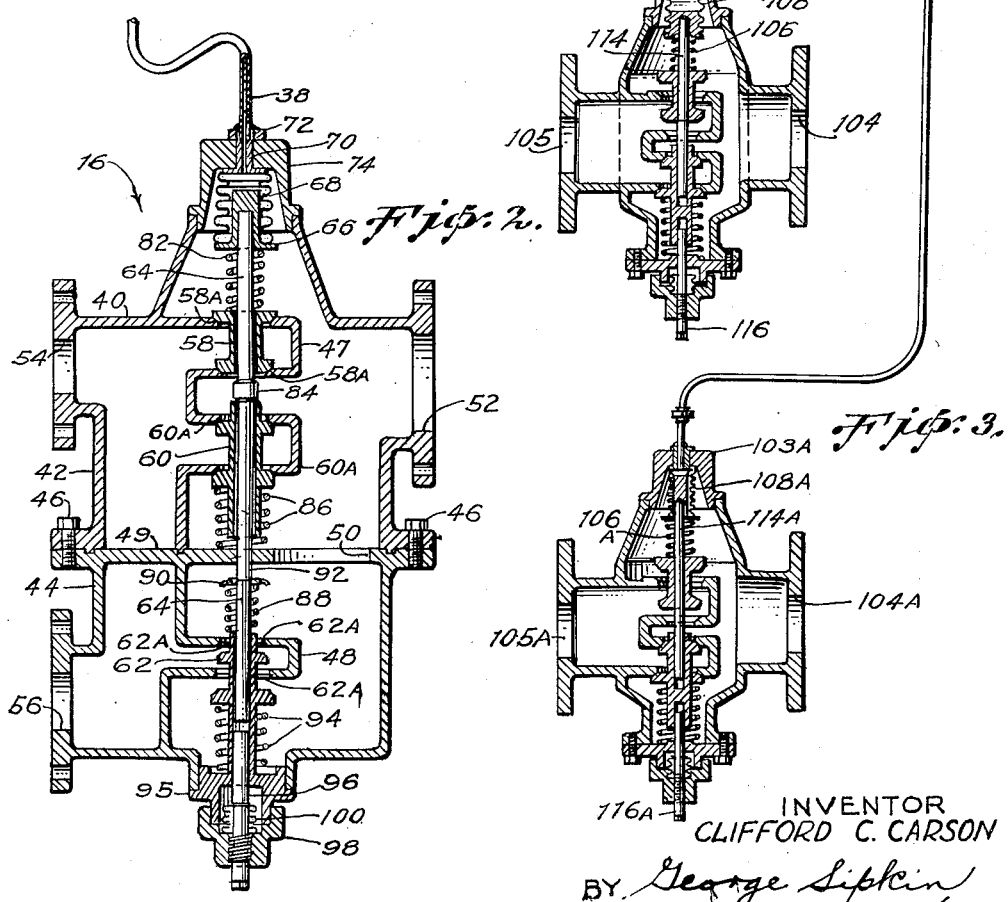
INVENTOR
CLIFFORD C. CARSON
BY George Sipkin
Paul N. Critchlow Jr.
ATTORNEYS though not illustrated, a three-way valve could be positioned in line 14 to shut off flow through the upper coil during the winter season as an added safety measure to insure that the thermostat cannot operate the regulator to furnish heat and cooling simultaneously.

2,778,570
FLUID FLOW REGULATOR
Clifford C. Carson, Washington, D. C.
Application November 20, 1952, Serial No. 321,748
3 Claims. (Cl. 236—1)
(Granted under Title 35, U. S. Code (1952), sec. 266)

This invention relates to heat-transfer apparatus for controlling or maintaining desired temperature conditions.

The invention may be manufactured and used by or for the Government of the United States of America for governmental purposes without the payment of any royalties thereon or therefor.

In many larger structures such as buildings or ships, the temperature conditions in the compartments are controlled by a heat-exchange between atmosphere and a fluid flowing through coils of heat-transfer circuits. Usually, the fluid is pumped from a central source and each compartment is provided with some form of automatic control or regulator apparatus operable to admit temperature-regulating flow into the coils which also are located at selected positions in the compartments.

Such heat-transfer apparatus is effective and reasonably economical if the installation is subjected only to normal temperature variations and if it is correctly engineered for such conditions, but when extreme temperature differentials are to be met, the problem of providing an economical, as well as effective, installation has presented real difficulty. In shipboard installations, for instance, which must be effective either in arctic or tropic conditions, the problem of providing suitable heat exchange apparatus has been a real concern. Heating systems present some difficulty but the more troublesome problems lie in cooling since the temperature of coolant is limited and any increase in cooling capacity must be achieved by increasing the capacity of the cooling coils. However, increases in coil capacity also reduce the economy of operation, particularly when the installation is subjected to average temperature conditions or when it is utilized to provide heat for the compartments. Heating does not require the coil capacity necessary for cooling, so that the excess capacity only adds to the power requirements, and the same is true when excess coil capacity is used for cooling in normal or average weather conditions.

It is, therefore, an object of the present invention to provide heat-transfer apparatus capable of effectively cooling under extreme weather conditions and also capable of economical temperature control during average or cold weather conditions.

A related object is to provide a heat-transfer apparatus that has a selectively usable excess coil capacity available for high temperature conditions, such excess capacity being available only as a stand-by during other temperature conditions.

A further object is to provide heat-transfer apparatus according to the above objects in which the stand-by coil capacity is automatically utilizable. A more specific object is to provide a regulator for controlling flow through at least a pair of heat transfer circuits, one of this pair being available in a stand-by capacity and being automatically brought into use in response to the actuations of a thermostatic means.

Other objects are to provide an effective and economical heat-transfer apparatus equipped with a regulator by means of which the coil capacity can be automatically varied to suit exigencies of varying temperature conditions, the regulator also being operable in both winter and summer temperature control.

These and other objects will become apparent from the accompanying drawings and ensuing descriptions.

The objects of this invention are accomplished by the use of split-coil type of exchange apparatus and a fluid regulator that is connected between the coils and a source of the heat exchange medium. The regulator includes a valve for each of the coil circuits for controlling the flow through each coil independently of the other, preferably, to the extent that one coil may be placed in a stand-by condition ready for use to supplement the other coil when required by needs of the space to be conditioned. The valves are adapted to regulate the flow of either a heating and cooling medium, and, as such, are moveable in opposite directions, depending on which heat exchange medium is being ported through the heat exchanger. The moveable valve members in each valve system, most suitably, are mounted on a valve stem that is actuated by a single thermostatic means that may be set to maintain a predetermined summer and winter temperature in the space to be conditioned. In one form of the invention, the valve for each coil may be integrally connected to a single valve stem common to both systems, while another modification utilizes separate valve systems. However, each modification is controlled by a single thermostatic means positioned in the space to be conditioned. Safety provisions may be incorporated in the valve systems to prevent the valve system that controls summer operation from operating during winter operations.

The invention is illustrated in the accompanying drawing in which Fig. 1 is a diagrammatic view of a split-coil type of heat exchanger in which one form of the regulator provided by this invention is incorporated; Fig. 2 an enlarged vertical section taken along lines II—II of Fig. 1, and Fig. 3 a longitudinal section of a modified regulator capable of use with the split-coil heat exchanger of Fig. 1.

Referring to Fig. 1 of the accompanying drawing, heat exchanger 4 is of a split-coil type having an upper coil 6 and a lower coil 8 past which the air in the rooms or compartments flows, as indicated by arrows 10. Customarily, these coils are finned and have their upper terminal ends connected by lines 12 and 14 to a heat-transfer medium regulator 16, the lower terminal ends of the coils being connected through lines 20 and 22 to a common return line 18 leading to the source of the heat exchange medium. A one-way valve 24 may be positioned in line 22 to prevent a back flow from the upper coil into the lower coil when the latter is not in use.

In operation, the heat exchanger is adapted for both winter and summer use, and for this purpose a common feed line 30 is connected by a T coupling to a hot water conduit 26 or a cold water line 28. Also, it is desirable that the flow of either the hot or cold fluid be individually controlled, and this is accomplished by the provision of suitable gate valves 32 and 34.

Regulator 16, detailed in Fig. 2, forms a principal feature of this invention and functions as a self-contained valve system for governing the flow of heat exchange medium for both summer and winter operation through one or both of the heat exchanger coils, depending on the temperature of the air space to be conditioned as measured by a thermostat 36 connected to the regulator by a capillary tube 38. The thermostat normally is located in the space being served by the heat exchanger, or it may be positioned in the return duct which carries the air from the space conditioned back to the heat exchanger. With a low demand for cooling during summer operations, the regulator will modulate the flow through only the lower coil until a maximum flow is reached, and upon any additional demand for cooling as measured by thermostat 36, the regulator will supplement the full flow through the lower coil by opening and modulating the flow through the upper coil. With a decrease in demand for cooling, the flow through the coils is restricted in reverse order. During winter operations only the upper coil need be utilized as the load never is so great that the lower coil is required. However, as shown in the modification in Fig. 3, provision may be made for use of both coils during winter operations.

Referring to Fig. 2, the regulator comprises a body 40 formed of individual upper and lower halves 42 and 44 having mating flanges clamped together by bolts 46, or the body, if desired, may be cast as a one-piece construction. Each regulator body half is divided by vertical walls 47 and 48 intermediately supported by a plate 49, these walls separating each body half into inlet and outlet chambers. The inlet sides of the body halves are connected through an opening 50 in plate 49 to form a common reservoir which is supplied with the heat exchange medium through inlet opening 52 adapted to be connected to supply line 30 (Fig. 1). The outlet sides of the upper and lower body halves are provided with openings 54 and 56 connected to the upper terminal connections of coils 6 and 8 through lines 12 and 14, respectively. The flow of the heat exchange medium from the inlet to the outlet sides is governed by moveable poppet valve members 58 and 60 positioned in the upper valve body, and another poppet valve 62 positioned in the lower valve body. Each poppet valve is slidably mounted on a common valve stem 64 which extends longitudinally through the regulator and is reciprocated in response to thermostat 36 in a manner presently to be described. Stem 64 is suspended from socket 66 fixed in a bellows-motor 68 which is mounted by a thimble 70 and a nut 72 to a cap 74 threadedly attached to the upper end of the regulator body. The bellows is connected by capillary tube 38 to the lower end of bulb chamber 76 which with tube 38 and bellows 68 forms a self-contained closed system that may be filled with a suitable expansible fluid, liquid or gas. When the fluid is expanded by the air temperature surrounding the thermostat the volume of the fluid will exceed the volume of the thermostat and bellows 68 will be expanded by the increased fluid pressure to move stem 64 downwardly. Conversely, when the fluid is contracted by the air temperature of the space to be conditioned, the bellows collapse, drawing stem 64 upwardly. The temperature setting of the thermostat may be adjusted by rotation of knob 78 which changes the volume of chamber 76.

Structurally, poppet valves 58 and 60, which regulate the flow of the heat exchange medium, are spooled-shaped, each being provided with two integral end cap portions adapted to engage corresponding pairs of seats 58a and 60a. These caps move into opposite sides of wall 47, or, in other words, one cap portion moves into the inlet side of the regulator body while the other moves into the outlet side. This provision of duplicate poppet caps and passage ways enables each poppet valve to be balanced by the fluid pressure in the inlet side of the regulator which acts in opposite directions on the caps of each poppet. Also, the arrangement neutralizes the vorticular disturbance created by the flow of the heat exchange medium past the valve seats. The cap on the inlet side of the regulator body is preferably of a slightly larger diameter than the counterpart cap on the outlet side to insure a differential pressure that maintains the valve in a closed position when it is not actuated by the valve stem.

Valve 58 is biased to a downwardly seated position by a spring 82 positioned between socket 66 and the upper valve cap, and the valve is lifted to an open position in opposition to spring 82 by a valve stem shoulder 84 that engages the lower cap during upward stem movement. Consequently, as may have been surmised, valve 58 opens when the bellows contracts while valve 60 opens upon bellows expansion, so that valve 58 is used to control flow through coil 6 of heating medium during winter and valve 60 to control flow through this same coil of cooling medium during summer.

Poppet valve 62 is used to control fluid flow through lower coil 8 which, as explained, is used in conjunction with upper coil 6, and this valve also is spool-shaped to engage seats 62A. In action, valve 62 is arranged to open in advance of valve 60 and, to accomplish this purpose, a compression spring 88 is mounted on slidable valve stem 64 between the upper surface of this valve and a flanged shoulder 90. This spring urges the valve to an open position against the fluid pressure in chamber 44 and also against another coil spring 94, and the differential pressures are so fixed that any additional compression of spring 88 causes the valve to open. It is to be noted that valve 62 functions as a summer control valve for lower coil 8 as does valve 60 for upper coil 6, both valves operating in a predetermined sequence.

During summer operation, upon a demand for cooling in the air space, the valve stem initially moves valve 62 downwardly off of its seat by compressing springs 88 and 94, a sufficient flow of cooling medium thereupon being admitted to lower coil 8 to satisfy the demand. When the air temperature has risen to move valve 62 to its fully open position, lower coil 8 is provided with maximum flow, and a further demand will bring shoulder 84 downwardly to bear on valve 60 and to exert sufficient pressure on this valve to open it an amount equal to the demand. At this point both coils are in operation and such a condition remains until a decrease in demand occurs, at which time valve 60 closes followed by valve 62, the closing being in inverse order to the opening movement.

The maximum downward movement of valve stem 64 and the opening movement of valve 60 and 62 during summer operation may be limited by an adjustable stop rod 96 threadedly mounted in lower cap nut 98 and sealed by a bellows 100, the stop rod being aligned with and spaced from the free end of valve stem 64 any desirable amount.

As the heating of the air space to be conditioned during winter operations does not require the volume or capacity of heat exchange medium required for cooling, only one coil, and, therefore, only one valve (valve 58) is needed for controlling the admission of heating medium to the heat exchanger. Most advantageously, this valve may be positioned in upper body half 42 so as to be positively actuated by valve stem shoulder 84. If the installation requires the use of both coils during winter operation, an additional valve may be furnished as illustrated in the modification of Fig. 3 presently to be described. During winter operation the adjustable stop rod 96 provides an additional safety function in that it may be screwed into the regulator to abut the valve stem and thereby prevent such opening of valves 60 and 62 as may be caused by an override of the air space temperature due to the starting of some heat producing equipment such as may be located in the space to be conditioned.

The modified regulator 102 illustrated in Fig. 3 is similar in construction and operation to regulator 16 of Fig. 2, differing principally in the containment of the valve systems in separate valves bodies 103 and 103a adapted to be connected jointly to the same supply of heat transfer medium through openings 104 and 104a, and to the lower and upper coils of the heat exchanger through openings 105 and 105a, respectively. The separate valve systems are substantial duplicates, both being somewhat similar to the valve arrangement mounted in upper valve body 42 of the prior modification. However, as separate valve stems 106 and 106a are utilized each valve stem regulates the flow through its respective valve system, thereby eliminating many of the elements required by the unitary modification, such as valve stem collar 84 and compression springs 88 and 94. Valve stems 106 and 106a are operated by separate bellows-motors 108 and 108a connected to the single thermostat 36 by capillary tube extensions 110, 110a and T connection 112.

The sequential operation of the valve systems in regulator bodies 103 and 103a may be accomplished by making the bellows-motor 108 of a larger diameter than the bellows 108a to achieve an initial movement of stem 106, or both bellows-motors may be made of the same diameter and the load of closing springs 114 and 114a varied to give the same results. Adjustable stop rods 116 and 116a may be provided to serve the same safety function as stop rod 96 previously described.

The operation of each regulator 16 and 102 is substantially the same and the description of regulator 16 shown in Fig. 1 should suffice. With the thermostat set for a desired summer temperature, such as 75° F., gate valve 32 is closed and valve 34 is opened porting chilled water to both upper and lower regulator halves where it is blocked by the valve systems. When the air temperature in the space rises above the prescribed summer temperature of 75° F., the thermostat fluid increases in volume and expands bellows motor 68 to move valve stem 64 downward to compress spring 88 and open valve 62 to initiate the flow of chilled water through lower coil 8. Valve 62 continues to open to satisfy any increased demand until maximum flow is achieved, any increased demand then causing a further downward movement of stem 64 to depress valve 60 against spring 86 to commence flow of chilled water through upper coil 6, supplementing the maximum flow through the lower coil circuit. Both valves then are porting chilled water through their respective coils. When the demand for cooling diminishes, valve stem 64 is moved upward to its neutral position by the contraction of the bellows, this movement first closing valve 60 and then finally valve 62 to completely shut off the flow of chilled water through the heat exchanger.

For winter operation, with the thermostat set for a minimum temperature of around 70° F., gate valve 28 is closed and valve 26 is opened porting hot water, or other heating medium, to regulator 16. Adjustable stop rod 96 may be screwed into the regulator to prevent such downward movement of the valve stem as possibly might open valves 60 and 62. A reduction of air temperature in the air space below 70° F. causes stem 64 to move upward by the contraction bellows 68 thereby lifting valve 58 off its seat to admit the heating medium through upper coil 6 of the heat exchanger. Of course, when the prescribed temperature condition is reached, the bellows contracts to close the valve. The operation of the modified regulator of Fig. 3 does not differ in principle from that of regulator 16, except that both exchanger coils may be used during winter operation.

In accordance with this invention, a regulator is provided for thermostatically controlling a fluid system having a plurality of circuits, such as a split-coil heat exchanger. The regulator contains at least two valve systems, one for each circuit in the heat exchanger, and each valve system is independently operated in sequence and at a different temperature in response to a single thermostat common to both valve systems. Separate valve members may be provided in each valve system to control the admission of either heating or cooling mediums through the different circuits. The valve systems may be integrally connected with a common valve stem that is moved by a single bellows-motor driven by the thermostat, or separate valve systems may be provided with each having a separate valve stem that is operated by an individual bellows-motor. Thus, with either type of regulator the flow of fluid through one or both circuits of the heat exchanger may be controlled automatically for summer or winter operation, depending on the temperature of the space to be conditioned.

However, the important fact to be noted is that such control is achieved in a most economical and efficient manner even though the installation be required to compensate for extreme heat or cold, and this is due to the fact that the present apparatus always uses only that particular coil capacity which is required to meet prevailing conditions. In winter only one coil need be used, while in summer or in unusually hot, tropic climates, there is a stand-by coil available for use, but not placed in use until required.

Obviously many modifications and variations of the present invention are possible in the light of the above teachings. It is, therefore, to be understood that within the scope of the appended claims the invention may be practiced otherwise than as specifically described.

I claim:

1. A regulator for controlling fluid flow through at least a pair of circuits, said regulator including a pair of valves openable in opposite directions for directing fluid flow, a third valve for regulating fluid flow, said third valve being openable in the same direction as and in a sequential relationship with one of said pair of valves, moveable means for controlling said valves, and temperature-responsive means for moving said moveable means in opposite directions, one of said oppositely moveable pair of valves automatically closing when the other of said pair opens one of said pair of circuits and said third valve opening in sequence with said open valve to supplement fluid flow by incrementally opening the other said pair of circuits.

2. Heat transfer apparatus comprising a pair of heat exchanger coils, a regulator for controlling the flow of heat transfer medium into said coils, means for supplying said medium to said regulator, and means for controlling said regulator, said regulator being provided with a separate transfer medium outlet chamber for each of said coils and with means independently communicating each of the coils with each of said separate chambers, said regulator further including a pair of valves selectively openable in opposite directions for directing medium flow alternately into one or the other of said outlet chambers, a third valve openable in the same direction and in sequential relationship with one of said pair of valves, and means for maintaining the other of said pair closed during said sequential opening, said regulator control means including movable means for controlling said valves, and temperature-responsive means for moving said movable means in opposite directions, said third valve being disposed for directing medium flow into the outlet chamber of said closed valve whereby said sequential opening supplements heat transfer by permitting medium flow through both of said exchanger coils.

3. Heat transfer apparatus comprising a pair of heat exchanger coils, a regulator for controlling the flow of heat transfer medium into said coils, means for supplying said medium to said regulator, and means for controlling said regulator, said regulator being provided with a separate transfer medium outlet chamber for each of said coils and with means independently communicating each of the coils with each of said separate chambers, said regulator further including a pair of valves selectively openable in opposite directions for directing medium flow alternately into one or the other of said outlet chambers, a third valve openable in the same direction and in sequential relationship with one of said pair of valves, and means for maintaining the other of said pair closed during said sequential opening, a single valve stem for controlling said valves, and temperature-responsive means for moving said stem in opposite directions, said third valve being disposed for directing medium flow into the outlet chamber of said closed valve whereby said sequential opening supplements heat transfer by permitting medium flow through both of said exchanger coils.

References Cited in the file of this patent

UNITED STATES PATENTS

| | | |
|---|---|---|
| 1,922,220 | Sprague | Aug. 15, 1933 |
| 2,121,977 | Newell | June 28, 1938 |
| 2,492,757 | Meek | Dec. 27, 1949 |
| 2,495,226 | Crago | Jan. 24, 1950 |
| 2,495,272 | Lum | Jan. 24, 1950 |
| 2,556,479 | McGrath | June 12, 1951 |

FOREIGN PATENTS

| | | |
|---|---|---|
| 594,280 | Germany | Apr. 6, 1934 |